Dec. 12, 1961  ATSUYOSHI OUCHI  3,013,225
ELECTROSTATIC COUPLING SYSTEM
Filed Aug. 3, 1959  2 Sheets-Sheet 1
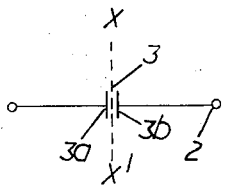
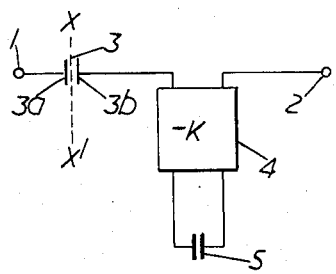
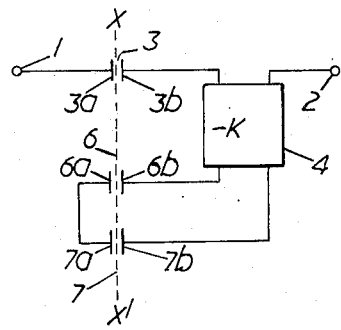
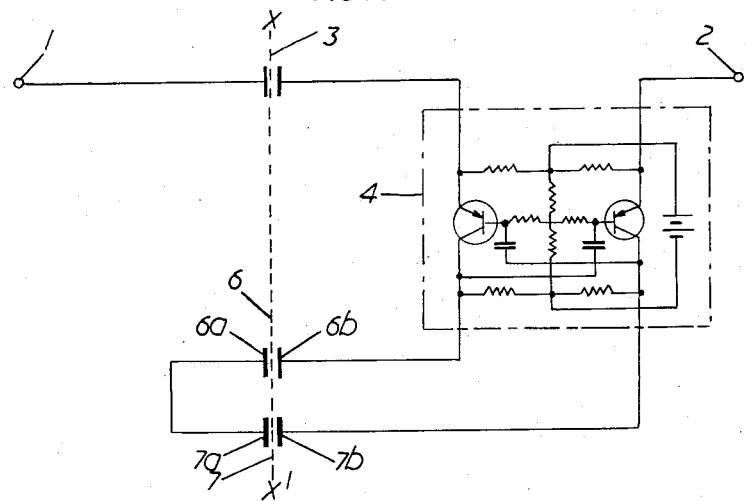
Inventor
A. OUCHI
By Robert Harding J.
Attorney Dec. 12, 1961  ATSUYOSHI OUCHI  3,013,225
ELECTROSTATIC COUPLING SYSTEM
Filed Aug. 3, 1959  2 Sheets-Sheet 2
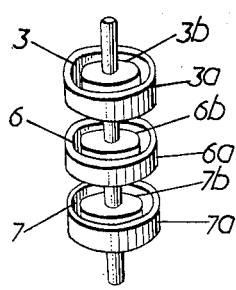
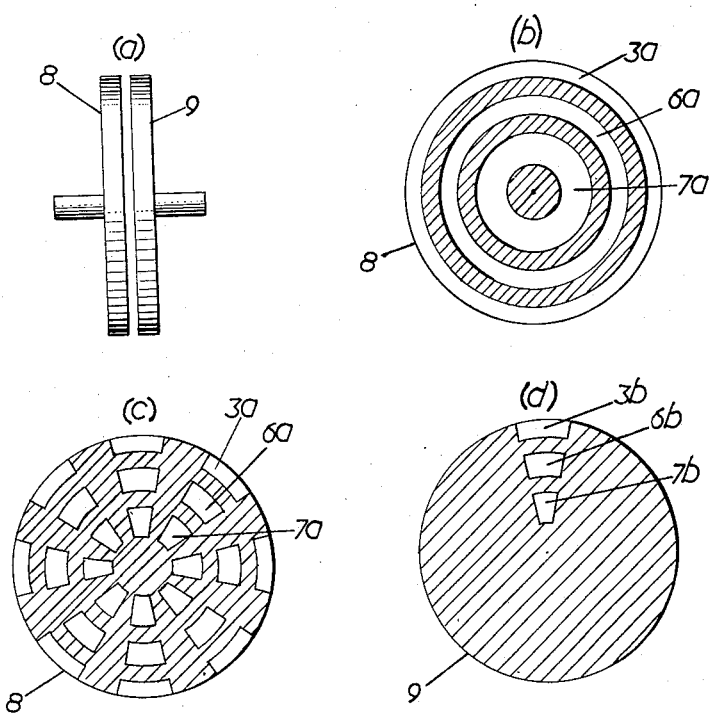
Inventor
A. OUCHI
By Robert Hardwig Jr.
Attorney

3,013,225
ELECTROSTATIC COUPLING SYSTEM
Atsuyoshi Ouchi, Tokyo, Japan, assignor to Nippon Electric Company, Limited, Tokyo, Japan, a corporation of Japan
Filed Aug. 3, 1959, Ser. No. 831,403
Claims priority, application Japan Aug. 27, 1958
3 Claims. (Cl. 333—24)

This invention relates to a system for transmitting an electric signal and more particularly to an electrostatic coupling system.

Where a part of an electric signal transmission system performs a rotary motion relative to another part of said system, a slip ring which is capable of maintaining a sliding contact between conductors is used in order to perform electric signal transmission between the rotating and fixed parts. Use of slip rings, however, will produce noise current due to variation in contact resistance. Therefore, it has been a common practice to pass the signal current through the slip ring after amplification. A disadvantage with such a construction is that, where a signal is to be transmitted from the rotating to the fixed part, an amplifier must be installed within the rotating part. Insallation of the amplifier wihin the rotating part has also been found to produce noise.

Another disadvantage of this form of construction is that the slip rings when left unused for a long period of time, or if excessively used result in faulty contact due to oxidation or wear.

Another coupling system free from some of the above defects, such as a magnetic coupling system, has also been proposed in which rotating and fixed parts are provided with windings corresponding to the primary and secondary windings of a transformer.

However, this type of coupling system, also contains various defects, such as complex and bulky construction, as well as susceptivity to inductive interference from other parts of the system, etc.

Accordingly, an electrostatic coupling system is proposed, having each of the rotating and fixed parts provided with an electrode or electrodes in such a manner that the electric signal may be transmitted through the electrostatic capacity existing between both electrodes facing each other when rotating.

The above-mentioned and other features and objects of the invention and the manner of attaining them will become more apparent and the invention itself will be best understood by reference to the following description of an embodiment of the invention taken in conjunction with the accompanying drawings in which:

FIG. 1 shows a block diagram illustrating an earlier form of electrostatic coupling system previously used.

FIGS. 2 and 3 show circuit diagrams in block diagram form illustrating the principle of this invention.

FIG. 4 shows a circuit diagram illustrating the principle of this invention.

FIGS. 5 and 6 show, respectively, an example of the construction of electrostatic coupling that forms a part of this invention.

FIG. 1 illustrates the left and right-hand sections representing the rotating and fixed parts, respectively. It will also be understood that the electric signal is transmitted from terminal 1 in the rotating part to terminal 2 in the fixed part.

Coupler 3 represents an electrostatic capacity for coupling both sections, with electrode 3a provided for the rotating part and the electrode 3b for the fixed part. Although the present system with comparatively simple construction is capable of transmitting a signal without resorting a contacting parts, still, it has the following disadvantages.

First, in order to reduce the loss at the coupling portion for the transmitted signal, electrodes 3a and 3b must be closely spaced. Further, in order to maintain the proper circular rotation of the rotating electrode, extremely accurate machining is required.

Secondly, each electrode requires a comparatively large surface area.

Thirdly, it is extremely difficult to manufacture a coupler which will produce an electrostatic capacitance in excess of several hundred microfarads.

Fourthly, in the case of either electrostatic coupling or magnetic coupling systems any mechanical defects existing in the coupling electrodes or in the spacing between the electrodes will result in the coupled signal being modulated by these imperfections and a subsequent increase in the signal to noise ratio is developed.

The present invention relates to an electric signal transmission system consisting of rotating and fixed parts which are electrostatically coupled so as to substantially eliminate all the aforementioned defects.

A detailed explanation of this invention will now be given below.

In FIG. 2, 4 represents the negative impedance converter and 5 the capacitor which is connected to the short circuit side of the converter. The other side of converter 4 is connected in series with electrostatic coupler 3 having a capacitance value of $C_3$.

Let the capacitance of the capacitor 5 and the conversion factor of the negative impedance converter 4 be $C_5$ and $-K$, respectively. Capacitance $C_3$ and negative capacitance $$-\frac{C_5}{K}$$

are shown connected in series between terminals 1 and 2. The total equivalent capacitance between terminals 1 and 2 denoted by $C_t$, is then equal to $$C_t = \frac{\frac{C_5 C_3}{K}}{\frac{C_5}{K} - C_3} \qquad (1)$$

The values of the capacitances are now selected to produce the following relation $$C_3 = \frac{C_5}{K} \qquad (2)$$

From Equation 1 we can see that $C_t$ becomes infinite, if no impedance is inserted between terminals 1 and 2. $K$ is a positive real number equal or close to unity in an ordinary negative impedance converter circuit. By using a transformer, this value may be converted to any positive real number, and the condition of Equation 2 can be easily satisfied.

If the capacitance of coupler 3 does not vary with time, the condition of Equation 2 can be satisfied by simply using a fixed value of capacitance for capacitor 5. This enables the loss in coupling of this system to be maintained at zero at all times.

If the capacitance of coupler 3 varies due to an imperfect rotating motion, the condition of Equation 2 will collapse and the value of C will not be equal to infinite. This results in a transmission loss being produced by the coupler 3.

This invention further eliminates the above-mentioned defect with the system illustrated in FIG. 3.

In FIG. 3 electrodes 6a and 7a are connected to the rotating parts, while electrodes 6b and 7b are connected to the fixed parts. Couplers 6 and 7 are similar in construction to coupler 3. In lieu of capacitor 5 in FIG. 2, the negative impedance converter 4 is terminated with couplers 6 and 7 being connected in series with it. If the capacitances of couplers 6 and 7 be $C_6$ and $C_7$, respectively, and CM be the total capacitance of this branch then $$C_m = \frac{C_6 C_7}{C_6 + C_7} \quad (3)$$

The total equivalent capacitance $C_t$ of FIG. 3 is then:

$$C_t = \frac{\frac{C_m C_3}{K}}{\frac{C_m}{K} - C_3} \quad (4)$$

The values of capacitance are now selected to produce the following relationship $$C_3 = \frac{C_m}{K} \quad (5)$$

Then the value of $C_t$ will become infinite.

Suppose that, under this condition, the rotating part has started motion relative to the fixed part and the capacitance of the coupler 3 is varied in proportion to a function of time $f(t)$. Then the instantaneous capacitance of coupler 3 becomes equal to $C_3[1+f(t)]$.

By making the construction of couplers 6 and 7 as near to that of coupler 3, the instantaneous capacitance values of couplers 6 and 7 become $C_6[1+f(t)]$ and $C_7[1+f(t)]$, respectively. Therefore, as will be evident from Equation 3, the instantaneous value of $C_m$ will also become $C_m[1+f(t)]$. Since the instantaneous values of $C_3$ and $C_m$ vary similarly, Equation 5 will be satisfied at all times if $C_3$ varies with rotation. Thus the total equivalent capacitance $C_t$ can be maintained at infinity at all times and a lossless state will exist between terminals 1 and 2.

Thus, any undesirable capacitance produced by mechanical imperfections in coupler 3 will be compensated by the combination of the negative impedance converter, which produces an inversion of the capacitance variation produced in corresponding couplers 6 and 7 to balance the undesirable capacitances produced by coupler 3.

It will be evident that by using the principle of this invention the losses due to faulty construction of the couplers can be substantially reduced to zero. Further, since the above-mentioned principle holds true irrespective of the magnitude of the capacitance $C_3$, the surface area of the electrodes may be reduced or the spacing between electrodes may not be as critical. This greatly reduces the critical manufacturing tolerances and extremely facilitates the construction of the couplers. As a result of the balancing effect of the auxiliary couplers 6 and 7, the overall size of the couplers can be reduced as compared with conventional ones formerly used.

The greatest advantage of this invention is that losses due to eccentricity of the rotating part of the coupler or deviation in the axial direction, will not affect the operating efficiency of the coupling system.

As far as practical construction and motion are concerned, it is difficult to make the instantaneous value of $C_m$ proportional to the instantaneous capacitance value coupler 3. By presetting the value of $C_t$ to approximately infinity slight deviations from the linear relationship between $C_3$ and $C_m$, can be practically ignored.

To construct the negative impedance 4 in FIG. 3, it is necessary that the conversion factor K be maintained constant at all times within the operating signal level range. Generally speaking, a converter of small size and low power consumption may be manufactured if a low signal level is desired for the transmission system concerned.

Care must be exercised in the selection of the various circuit components in order to prevent unwanted losses due to spurious oscillation and improper matching impedances at the output of the converter.

In the above-mentioned figures the rotating electrode is on the left-hand side and the fixed electrode is on the right-hand side of section line XX'. Thus the negative impedance converter is enclosed within the fixed electrode so that it is free from vibrations. If necessary, the rotating and fixed parts may be interchanged. In each of the figures illustrated, it is possible to transmit a signal from either terminals 1 to 2 or from 2 to 1. FIG. 4 illustrates a well-known circuit in which 4 represents the internal circuit of the negative impedance converter.

FIG. 5 merely illustrates the mechanical construction of the electrostatic couplers 3, 6 or 7 previously referred to in FIG. 3. The electrodes 3b, 6b and 7b rotate about the same axis or shaft, whereas electrodes 3a, 6a, and 7a are connected to the fixed part. By constructing couplers 3, 6 and 7 similar to each other, the unwanted capacitance variations due to eccentric movement of the rotating electrodes or axial displacement of the rotating shaft, will be cancelled due to the compensating effect produced by each of the couplers.

FIG. 6 illustrates additional coupling arrangements. As shown in FIG. 6a, two discs 8 and 9 are connected so that one remains fixed and the other rotates. By installing three electrodes in concentric form, as shown in FIG. 6b, on one disk plate 8 and the other three corresponding electrodes on the other disc plate 9, it will be seen that a coupling arrangement is produced, using the same broad principle pertaining to the coupling arrangement in FIG. 5.

If the electrode on disc plate 8 is divided into several radial bands and the electrodes on disc plate 9 are shaped to correspond to one of the radial bands, a coupler, such as shown in FIG. 6d, is produced. Switching action among several signal circuits may be performed when one disc is rotated with respect to the other. If two equal discs of the same construction as shown in FIG. 6c face each other in rotation, combinations of several signal circuits on the fixed part and those on the rotating part may be easily switched from one to the other. It will be noted that, in this example, the number of negative impedance converters must be equal to the individual signal circuits. FIGS. 5 and 6 are simply different embodiments of the same invention.

In the foregoing description, the signal transmission circuit has been shown in single-line diagram form, as indicated by terminals 1 or 2 in each diagram. In cases where the return circuit is grounded, the frame of the rotating body and the frame of the fixed body are, in most cases, connected conductively with a bearing, etc. In such a case, the frame is used as a return circuit and only a single line need be considered as a transmission line for performing electrostatic coupling. Where it is not appropriate to use the frame as a return circuit, it is only necessary that one or more electrostatic couplers be provided between the rotating and fixed electrodes.

While I have described above the principles of my invention in connection with specific apparatus, it is to be clearly understood that this description is made only by way of example and not as a limitation to the scope of my invention, as set forth in the objects thereof and in the accompanying claims.

What is claimed is:
1. A rotary coupling system for transmission of alternating electric current between two points which are rotating with respect to each other, comprising a first capacitive coupler having a rotor electrode and a stator electrode, a negative impedance converting network having a first and a second side each of which has a pair of terminals, one of the terminals of the first side being connected to said stator electrode of said first capacitive coupler, second and third capacitive couplers serially connected with each other and terminating said pair of terminals of said second side of said converting network, said second and third capacitive couplers having corresponding rotor and stator electrodes, a shaft, means for mounting the rotor electrodes of said first, second and third capacitive cou- plers on said shaft, said rotor electrode of said first coupler and the other of the terminals of said first side of said network providing said two points for transmitting signals therethrough.

2. A rotary coupling system as in claim 1, in which said first, second and third couplers form a single unit having one rotating element and one fixed element, and having corresponding rotor electrodes and stator electrodes mounted concentrically on said rotating and fixed elements.

3. A rotary coupling system as in claim 2, wherein the electrodes on one of said fixed or rotating elements are divided into a plurality of radial groups and the other electrodes of said element are arranged in a single radial group.

References Cited in the file of this patent

UNITED STATES PATENTS

| | | |
|---|---|---|
| 2,386,651 | Bisson | Oct. 9, 1945 |
| 2,602,118 | Adams | July 1, 1952 |